US011022047B2

(12) United States Patent
Zsurka et al.

(10) Patent No.: US 11,022,047 B2
(45) Date of Patent: Jun. 1, 2021

(54) EXTERNAL TURNING VANE FOR IFS-MOUNTED SECONDARY FLOW SYSTEMS

(71) Applicant: UNITED TECHNOLOGIES CORPORATION, Farmington, CT (US)

(72) Inventors: Mark Zsurka, Goldens Bridge, NY (US); Laurel F. Carlson, Terryville, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 283 days.

(21) Appl. No.: 16/534,150

(22) Filed: Aug. 7, 2019

(65) Prior Publication Data

US 2021/0040897 A1  Feb. 11, 2021

(51) Int. Cl.
*F02C 9/18* (2006.01)
*B64D 33/02* (2006.01)
*F02C 7/04* (2006.01)
*F02C 7/045* (2006.01)
*F02C 7/055* (2006.01)

(52) U.S. Cl.
CPC ............... *F02C 9/18* (2013.01); *B64D 33/02* (2013.01); *F02C 7/04* (2013.01); *F02C 7/045* (2013.01); *F02C 7/055* (2013.01); *F05D 2220/32* (2013.01); *F05D 2240/127* (2013.01); *F05D 2260/606* (2013.01)

(58) Field of Classification Search
CPC .... F02C 9/18; F02C 7/04; F02C 7/045; F02C 7/055; F05D 2220/32; F05D 2240/127; F05D 2260/606; B64D 33/02
See application file for complete search history.

(56) References Cited

U.S. PATENT DOCUMENTS

| | | | |
|---|---|---|---|
| 3,744,745 A | 7/1973 | Kerker et al. | |
| 3,934,846 A | 1/1976 | Maurer | |
| 4,782,658 A * | 11/1988 | Perry | F02C 7/047 60/226.1 |
| 4,836,473 A | 6/1989 | Aulehla et al. | |
| 6,050,527 A * | 4/2000 | Hebert | B64D 33/02 244/210 |
| 8,240,616 B2 * | 8/2012 | Miller | B64C 21/04 244/204 |
| 8,257,036 B2 | 9/2012 | Norris | |
| 9,810,147 B2 * | 11/2017 | Tretow | F02C 7/18 |
| 10,145,304 B2 | 12/2018 | Weiner | |
| 10,233,869 B2 | 3/2019 | Rice | |
| 2003/0113205 A1 * | 6/2003 | Negulescu | B64D 33/02 415/182.1 |

(Continued)

OTHER PUBLICATIONS

European Patent Office, European Search Report dated Jan. 20, 2021 in Application No. 20189320.3.

*Primary Examiner* — Justin D Seabe
*Assistant Examiner* — Theodore C Ribadeneyra
(74) *Attorney, Agent, or Firm* — Snell & Wilmer L.L.P.

(57) ABSTRACT

An external turning vane includes a vane body extending radially from the inner cowl and disposed upstream from an inlet of the secondary flow system, the vane body configured to turn an airflow in a bypass flow path towards an axial direction to minimize separation between the airflow and the secondary flow system.

13 Claims, 4 Drawing Sheets

(56) References Cited

U.S. PATENT DOCUMENTS

| | | | |
|---|---|---|---|
| 2008/0179466 A1* | 7/2008 | Campbell | F02C 7/04 244/53 B |
| 2008/0203218 A1* | 8/2008 | Anderson | B64D 33/02 244/58 |
| 2009/0094989 A1 | 4/2009 | Kraft et al. | |
| 2010/0126182 A1* | 5/2010 | Hoover | F02K 3/06 60/785 |
| 2014/0053532 A1* | 2/2014 | Zysman | F02C 7/12 60/226.1 |
| 2014/0286764 A1* | 9/2014 | Laurant | F01D 25/24 415/182.1 |
| 2015/0330309 A1* | 11/2015 | Bagnall | F01D 9/065 60/785 |
| 2015/0361885 A1* | 12/2015 | Romano | B64D 33/02 415/1 |
| 2015/0369065 A1* | 12/2015 | Feiereisen | F01D 9/02 415/1 |
| 2016/0031290 A1* | 2/2016 | Molin | B64D 33/02 165/44 |
| 2017/0328280 A1 | 11/2017 | Hussain et al. | |
| 2018/0058473 A1 | 3/2018 | Kenworthy et al. | |

\* cited by examiner

EXTERNAL TURNING VANE FOR IFS-MOUNTED SECONDARY FLOW SYSTEMS

FIELD

This disclosure relates generally to gas turbine engines, and more particularly to secondary flow system arrangements for gas turbine engines.

BACKGROUND

A gas turbine engine may employ secondary flow system inlets that are positioned about the low pressure compressor in the inner fixed structure section of the inner cowl in general fluid communication with a fan duct of the gas turbine engine. More specifically, the inner surface of the outer nacelle and the outer surface of the inner cowl at the low pressure compressor section define a fan duct through which fan airflow is received. This fan duct is the source of airflow for IFS-mounted secondary flow systems.

SUMMARY

An external turning vane for a gas turbine engine having at least an inner cowl, and a secondary flow system is disclosed. The external turning vane comprises a vane body extending radially from the inner cowl and disposed upstream from an inlet of the secondary flow system, the vane body configured to turn an airflow in the bypass flow path towards an axial direction and to introduce higher momentum flow of a vortex into the inlet to minimize flow separation on a sidewall of the inlet.

In various embodiments, the vane body is oriented at a non-zero angle with respect to a centerline axis of the inlet.

In various embodiments, a first height of the vane body is less than a second height of the inlet.

In various embodiments, the inner cowl comprises an inner fixed structure (IFS).

In various embodiments, the vane body is disposed relative to the inlet such that a wake vortex generated by the vane body during operation of the gas turbine engine is completely or nearly completely ingested by the inlet.

In various embodiments, the vane body is configured to convert kinetic energy associated with a circumferential flow direction into a vortex to introduce a higher momentum flow of the vortex into the inlet of the secondary flow system to minimize propagation of a flow separation off a sidewall of the inlet.

In various embodiments, the vane body is configured to straighten the airflow diverted by a bifurcation of the gas turbine engine.

In various embodiments, the first height is a maximum height of the vane body and the second height is a maximum height of the inlet.

A secondary flow system for a gas turbine engine having an inner cowl is disclosed. The secondary flow system comprises an inlet disposed on the inner cowl, the inlet in fluid communication with a bypass flow path, and an external turning vane comprising a vane body extending radially from the inner cowl and disposed upstream from the inlet of the secondary flow system, the vane body configured to turn an airflow in the bypass flow path towards an axial direction and to introduce higher momentum flow of a vortex into the inlet to minimize flow separation on a sidewall of the inlet.

In various embodiments, the vane body is oriented at a non-zero angle with respect to a centerline axis of the inlet.

In various embodiments, a first height of the vane body is less than a second height of the inlet.

In various embodiments, the inner cowl comprises an inner fixed structure (IFS).

In various embodiments, the vane body is disposed relative to the inlet such that a wake vortex generated by the vane body during operation of the gas turbine engine is completely or nearly completely ingested by the inlet.

In various embodiments, the vane body is configured to convert kinetic energy associated with a circumferential flow direction into a vortex to introduce a higher momentum flow of the vortex into the inlet of the secondary flow system to minimize propagation of a flow separation off a sidewall of the inlet.

In various embodiments, the vane body is configured to straighten the airflow diverted by a bifurcation of the gas turbine engine.

A gas turbine engine is disclosed, comprising an outer nacelle, an inner cowl defining a bypass flow path along with the outer nacelle for receiving fan airflow, an inlet for a secondary flow system disposed on the inner cowl, the inlet in fluid communication with the bypass flow path, and an external turning vane comprising a vane body extending radially from the inner cowl and disposed upstream from the inlet of the secondary flow system, the vane body configured to turn an airflow in the bypass flow path towards an axial direction and to introduce higher momentum flow of a vortex into the inlet to minimize flow separation on a sidewall of the inlet.

In various embodiments, the vane body is oriented at a non-zero angle with respect to a centerline axis of the inlet.

In various embodiments, a first height of the vane body is less than a second height of the inlet.

In various embodiments, the inner cowl comprises an inner fixed structure (IFS).

In various embodiments, the vane body is disposed relative to the inlet such that a wake vortex generated by the vane body during operation of the gas turbine engine is completely or nearly completely ingested by the inlet.

In various embodiments, the vane body is configured to convert kinetic energy associated with a circumferential flow direction into a vortex to introduce a higher momentum flow of the vortex into the inlet of the secondary flow system to minimize propagation of a flow separation off a sidewall of the inlet.

In various embodiments, the vane body is configured to straighten the airflow diverted by a bifurcation of the gas turbine engine.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein. Thus, the detailed description herein is presented for purposes of illustration only and not of limitation. The scope of the disclosure is defined by the appended claims. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials. In some cases, reference coordinates may be specific to each figure.

As used herein, "aft" refers to the direction associated with the tail (e.g., the back end) of an aircraft, or generally, to the direction of exhaust of the gas turbine. As used herein, "forward" refers to the direction associated with the nose (e.g., the front end) of an aircraft, or generally, to the direction of flight or motion.

An external turning vane of the present disclosure is provided forward from a secondary flow system inlet. A wake vortex generated by the external turning body may be completely or nearly completely ingested by the inlet for improving secondary flow system inlet total pressure recovery. An external turning vane of the present disclosure may minimize air flow separation inside of the inlet.

Figure 1:
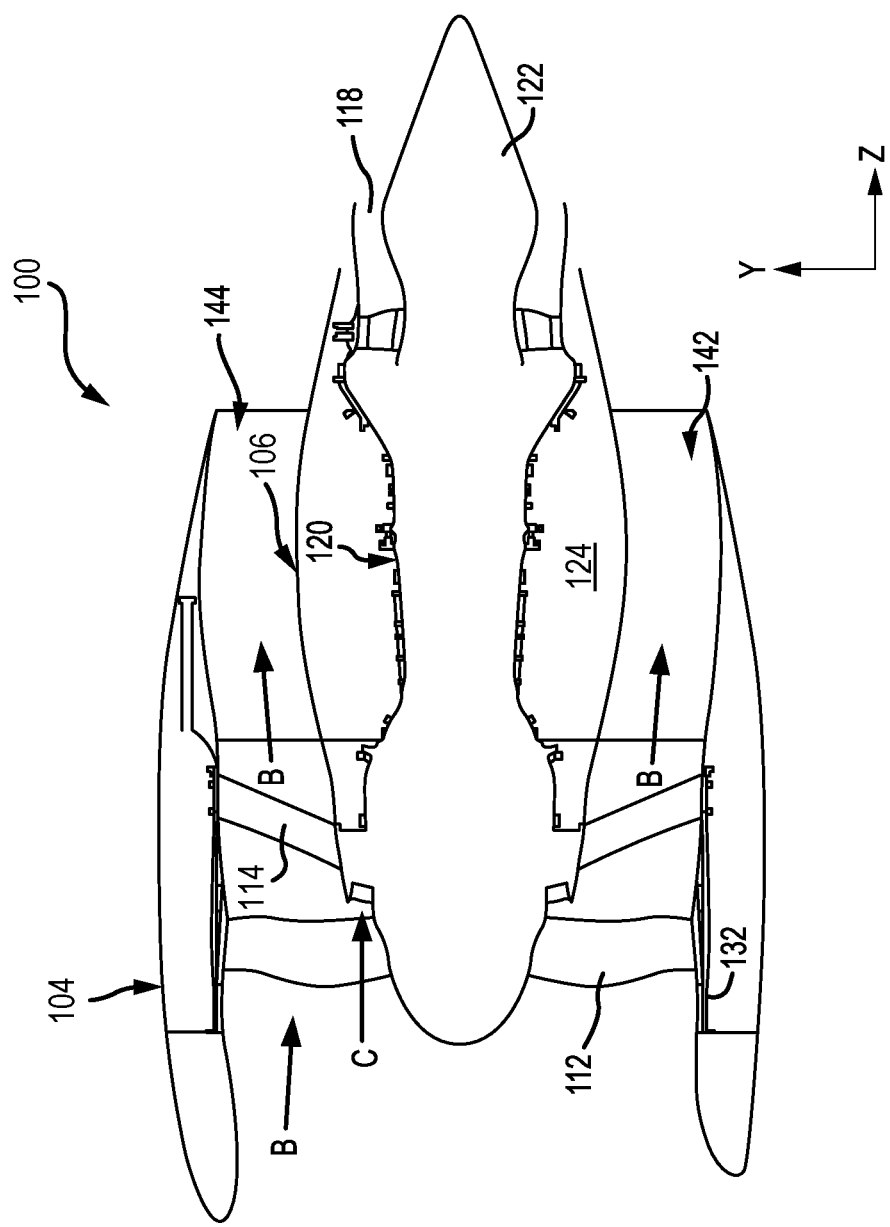
FIG. 1 illustrates a cross-section, schematic view of a nacelle for a gas turbine engine, in accordance with various embodiments.

FIG. 1 illustrates a schematic view of a gas turbine engine, in accordance with various embodiments. An xyz-axis is provided for ease of illustration. Gas turbine engine 100 may include core engine 120. Core air flow C flows through core engine 120 and is expelled through exhaust outlet 118 surrounding tail cone 122.

Core engine 120 drives a fan 112 arranged in a bypass flow path B. Air in bypass flow path B flows in the aft direction (z-direction) along bypass flow path B. At least a portion of bypass flow path B may be defined by outer nacelle 104 and inner cowl 106 (also referred to herein as an inner fixed structure (IFS)). Fan case 132 may surround fan 112. Fan case 132 may be housed within outer nacelle 104.

Outer nacelle 104 typically comprises two halves which are typically mounted to a pylon. According to various embodiments, multiple guide vanes 114 may extend radially between core engine 120 and fan case 132. Upper bifurcation 144 and lower bifurcation 142 may extend radially between the outer nacelle 104 and inner cowl 106 in locations opposite one another to accommodate engine components such as wires and fluids, for example.

Inner cowl 106 may surround core engine 120 and provide core compartment 124. Various components may be provided in core compartment 124 such as fluid conduits, compressed air ducts, and/or air-oil coolers, for example.

Figure 2:
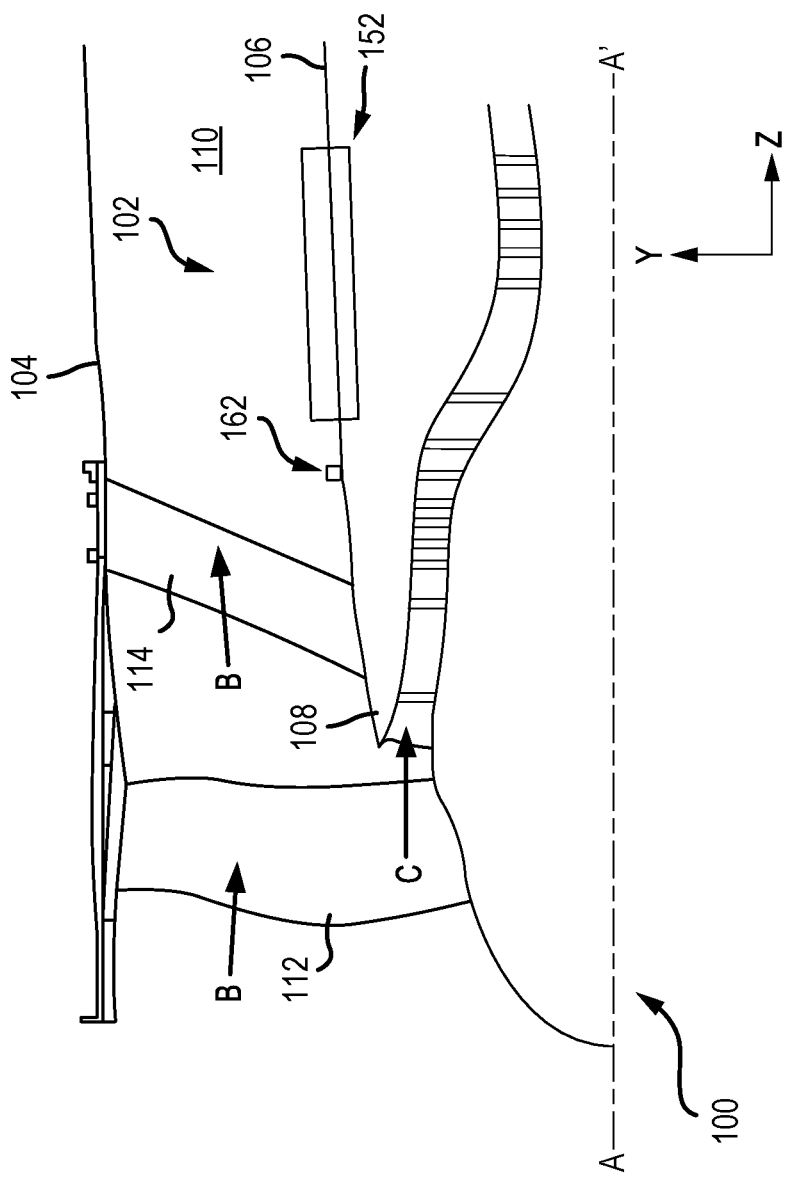
FIG. 2 illustrates a cross-section, schematic view of a section of a secondary flow system installed on a gas turbine engine nacelle, in accordance with various embodiments.

With respect to FIG. 2, elements with like element numbering, as depicted in FIG. 1, are intended to be the same and will not necessarily be repeated for the sake of clarity.

Referring to FIG. 2, the front section of a gas turbine engine 100 having an example secondary flow system 102 constructed in accordance with the present disclosure is provided. Among other things, the front section of the gas turbine engine 100 may generally include outer nacelle 104, inner cowl 106, a splitter 108, fan blades 112, exit guide vanes 114 and a fan duct 110 associated therewith. Moreover, airflow entering into the gas turbine engine 100 may be split by the splitter 108 into bypass flow path B flowing through the fan duct 110 and core air flow C flowing into the low pressure compressor.

The secondary flow system 102 of the gas turbine engine 100 of FIG. 2 may be disposed on an outer surface of the inner fixed structure, and generally composed of at least one secondary flow system 152 and an external turning vane 162 adjacent thereto. In various embodiments, the external turning vane is disposed downstream, or aft, of exit guide vanes 114.

Figure 3A:
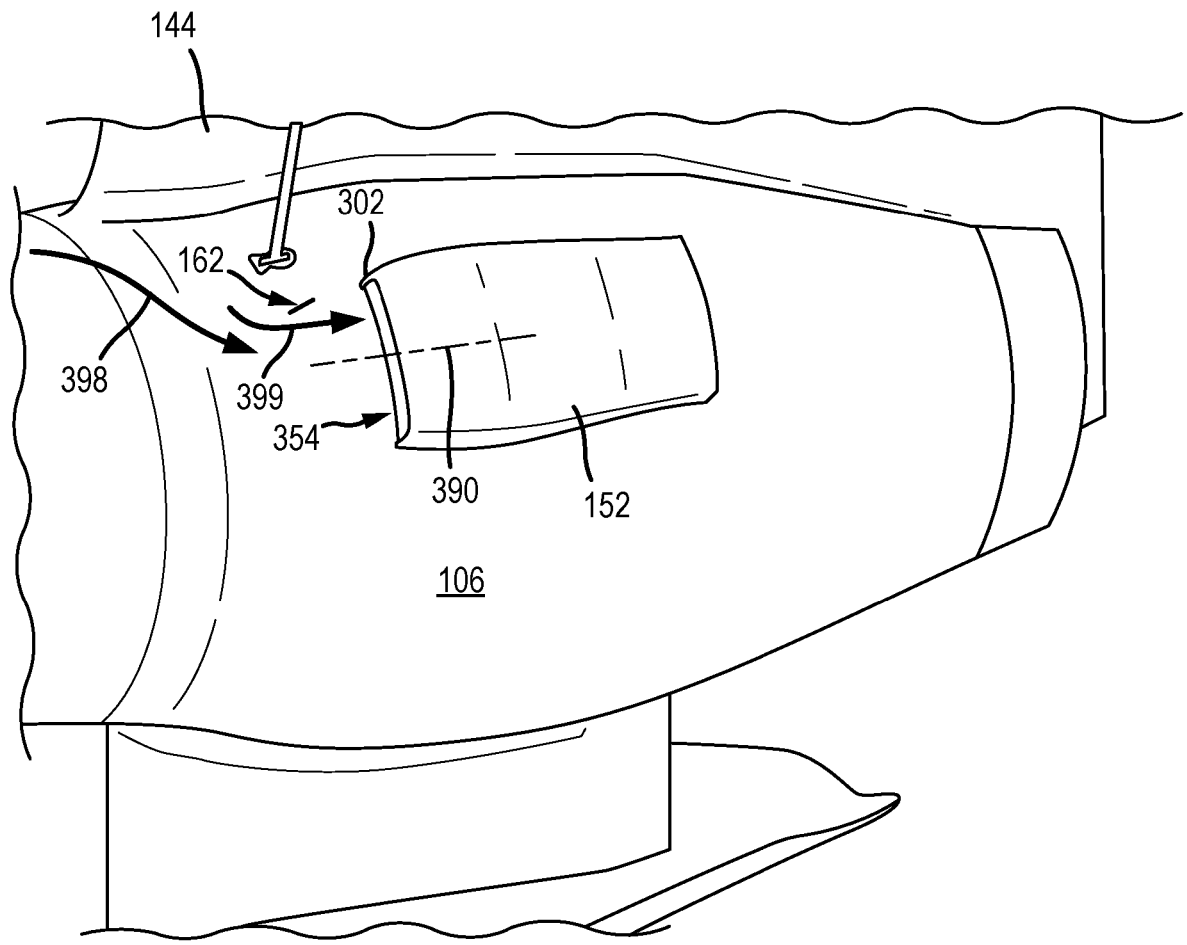
FIG. 3A illustrates a perspective view of an external turning vane for an inlet to a secondary flow system for a gas turbine engine, in accordance with various embodiments.

With reference to FIG. 3A, secondary flow system 152 receives bypass air through an inlet 354. In this regard, inlet 354 is in fluid communication with bypass flow path B. The upper bifurcation 144 may divert airflow through bypass flow path B around the upper bifurcation 144. The upper bifurcation 144 may tend to turn the bypass air, illustrated by arrow 398 in FIG. 3A, in the circumferential direction, causing the bypass air to enter inlet 354 at an angle with respect to a centerline axis 390 of inlet 354. This circumferential flow migration of the bypass air may tend to cause flow separation at a sidewall located circumferentially adjacent upper bifurcation 144, such as the upper side 302, of inlet 354, which may result in a total pressure deficit and decreased system mass air flow. In this regard, an external turning vane is provided, which may improve total pressure distribution across the inlet 354 and maximize system mass air flow.

In various embodiments, external turning vane 162 is disposed in front of inlet 354. That is, external turning vane 162 is disposed upstream from inlet 354. In various embodiments, external turning vane 162 is formed as a plate. In this regard, external turning vane 162 comprises a vane body 163 extending radially from the IFS 106. In various embodiments, external turning vane 162 is made of a metal such as a steel alloy, stainless steel, titanium, aluminum, or any other metal or alloy thereof. In various embodiments, external turning vane 162 comprises one or more machined metal parts. In various embodiments, external turning vane 162 comprises a fiber-reinforced composite material. External turning vane 162 may be configured to turn bypass air in an axial direction (e.g., parallel to a centerline axis A-A' of the gas turbine engine 100 (see FIG. 2)), illustrated by arrow 399, entering inlet 354, for example, such that the bypass air enters inlet 354 substantially parallel to centerline axis 390.

Figure 3B:
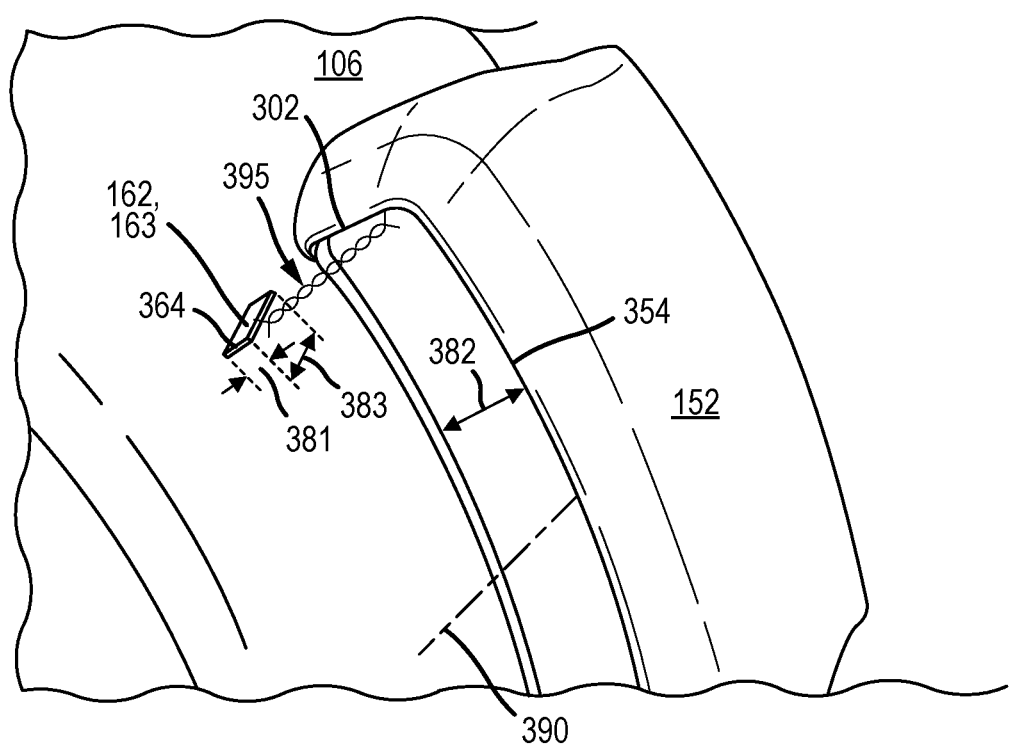
FIG. 3B illustrates a perspective view of the external turning vane of FIG. 3A and a wake vortex generated by the external turning vane ingested by the inlet, in accordance with various embodiments.

With reference to FIG. 3B, due to the aerodynamic effects of external turning vane 162, wake vortices 395 may be generated by external turning vane 162 and ingested by inlet 354. In this regard, external turning vane 162 may be placed in front of inlet 354 such that the wake vortices 395 generated thereby are completely ingested by inlet 354. In various embodiments, external turning vane 162 is placed in front of inlet 354 such that the wake vortices 395 generated thereby are completely or nearly completely ingested by inlet 354 at or near upper side 302, which may tend to minimize flow separation from upper side 302, improve total pressure distribution across the inlet 354, and maximize system mass air flow through secondary flow system 152. External turning vane 162 may be configured to turn the airflow (e.g., see bypass air 398 of FIG. 3A) in the bypass flow path such that the wake vortices 395 of the external turning vane 162 are directed at the portion of the inlet 354 challenged by flow separation. External turning vane 162 may be configured to convert kinetic energy associated with a circumferential flow direction (e.g., see bypass air 398 of FIG. 3A) into a vortex (e.g., wake vortices 395) to introduce a higher momentum flow of the vortex into the inlet 354 of the secondary flow system 152 to minimize propagation of a flow separation off a sidewall (e.g., upper side 302) of the inlet 354. As used herein, the term "higher momentum flow" means that the momentum of the wake vortices 395 is greater than the local momentum of the circumferential flow of bypass air 398.

In various embodiments, the aerodynamic effects of external turning vane 162 are further enhanced by optimizing the angle of the external turning vane 162 relative to centerline axis 390 to provide optimal vortex size and sidewall (e.g., upper side 302) interaction. In various embodiments, external turning vane 162 is oriented at a non-zero angle with respect to centerline axis 390. In various embodiments, external turning vane 162 is angled towards centerline axis 390. External turning vane 162 may be angled towards centerline axis 390 with the forward edge 364 pointed towards centerline axis 390. In various embodiments, a height 381 (also referred to herein as a first height), as measured in the radial direction, of external turning vane 162 may be less than or equal to a height 382 (also referred to herein as a second height) of the inlet 354. In this manner, the aerodynamic effects of external turning vane 162 are minimized or eliminated at locations radially outward from inlet 354. In various embodiments, height 381 is the maximum height of external turning vane 162. In various embodiments, height 382 is the maximum height of inlet 354. In various embodiments, the length 383 of external turning vane 162 is greater than the height 381 of external turning vane 162.

External turning vane 162 may be attached to IFS 106 via any known method suitable for attaching vanes to a cowl structure. For example, external turning vane 162 may be attached to IFS 106 via one or more fasteners, such as a rivet, a threaded fastener, a bolt, or a screw, among other types of fasteners. Furthermore, external turning vane 162 may be bonded to IFS 106 via an adhesive.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A secondary flow system for a gas turbine engine having an inner cowl, the secondary flow system comprising:
   an inlet disposed on the inner cowl, the inlet in fluid communication with a bypass flow path; and
   an external turning vane disposed upstream from the inlet, the external turning vane comprising a vane body extending radially from the inner cowl, the vane body configured to turn an airflow in the bypass flow path towards an axial direction and to introduce higher momentum flow of a vortex into the inlet to minimize flow separation on a sidewall of the inlet,
   wherein the external turning vane is the only external turning vane associated with the inlet for turning the airflow in the bypass flow path towards the axial direction to minimize flow separation on the sidewall of the inlet.

2. The secondary flow system of claim 1, wherein the vane body is oriented at a non-zero angle with respect to a centerline axis of the inlet.

3. The secondary flow system of claim 1, wherein a first height of the vane body is less than a second height of the inlet.

4. The secondary flow system of claim 3, wherein the first height is a maximum height of the vane body and the second height is a maximum height of the inlet.

5. The secondary flow system of claim 1, wherein the inner cowl comprises an inner fixed structure (IFS).

6. The secondary flow system of claim 1, wherein the vane body is disposed relative to the inlet such that a wake vortex generated by the vane body during operation of the gas turbine engine is completely or nearly completely ingested by the inlet.

7. The secondary flow system of claim 1, wherein the vane body is configured to convert kinetic energy associated with a circumferential flow direction into a vortex to introduce a higher momentum flow of the vortex into the inlet of the secondary.

8. The secondary flow system of claim 1, wherein the vane body is configured to straighten the airflow diverted by a bifurcation of the gas turbine engine.

9. A gas turbine engine, comprising:
an outer nacelle;
an inner cowl defining a bypass flow path along with the outer nacelle for receiving fan airflow;
an inlet for a secondary flow system disposed on the inner cowl, the inlet in fluid communication with the bypass flow path; and
an external turning vane disposed upstream from the inlet, the external turning vane comprising a vane body extending radially from the inner cowl, the vane body configured to turn an airflow in the bypass flow path towards an axial direction and to introduce higher momentum flow of a vortex into the inlet to minimize flow separation on a sidewall of the inlet,
wherein the external turning vane is the only external turning vane associated with the inlet for turning the airflow in the bypass flow path towards the axial direction to minimize flow separation on the sidewall of the inlet.

10. The gas turbine engine of claim 9, wherein the vane body is oriented at a non-zero angle with respect to a centerline axis of the inlet.

11. The gas turbine engine of claim 9, wherein a first height of the vane body is less than a second height of the inlet.

12. The gas turbine engine of claim 9, wherein the inner cowl comprises an inner fixed structure (IFS).

13. The gas turbine engine of claim 9, wherein the vane body is at least one of:
disposed relative to the inlet such that a wake vortex generated by the vane body during operation of the gas turbine engine is completely or nearly completely ingested by the inlet;
configured to convert kinetic energy associated with a circumferential flow direction into a vortex to introduce a higher momentum flow of the vortex into the inlet of the secondary; and
configured to straighten the airflow diverted by a bifurcation of the gas turbine engine.

* * * * *